United States Patent
Matsumura

(10) Patent No.: US 11,193,410 B2
(45) Date of Patent: Dec. 7, 2021

(54) ELECTRICALLY HEATED CATALYST

(71) Applicant: DENSO CORPORATION, Kariya (JP)

(72) Inventor: Yasuhiro Matsumura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/019,850

(22) Filed: Sep. 14, 2020

(65) Prior Publication Data

US 2020/0408125 A1    Dec. 31, 2020

Related U.S. Application Data

(63) Continuation of application No. PCT/JP2019/004764, filed on Feb. 11, 2019.

(30) Foreign Application Priority Data

Mar. 15, 2018  (JP) .............................. JP2018-048480

(51) Int. Cl.
| | |
|---|---|
| *F01N 3/20* | (2006.01) |
| *B01D 53/94* | (2006.01) |
| *B01J 35/04* | (2006.01) |
| *F01N 3/28* | (2006.01) |

(52) U.S. Cl.
CPC ............ *F01N 3/2013* (2013.01); *B01D 53/94* (2013.01); *B01J 35/04* (2013.01); *F01N 3/2803* (2013.01); *B01D 2255/9155* (2013.01); *F01N 2330/02* (2013.01); *F01N 2330/32* (2013.01); *F01N 2370/02* (2013.01)

(58) Field of Classification Search
CPC .... F01N 3/2013; F01N 3/2803; F01N 3/2026; B01J 35/04; B01D 2255/9155

USPC ......................................................... 422/174
See application file for complete search history.

(56) References Cited

U.S. PATENT DOCUMENTS

| | | | | |
|---|---|---|---|---|
| 5,393,586 A | * | 2/1995 | Lipp ..................... | F01N 3/2026 428/116 |
| 5,463,206 A | | 10/1995 | Abe et al. | |
| 2003/0086837 A1 | * | 5/2003 | Bruck ................. | F01N 13/0093 422/180 |
| 2003/0185724 A1 | * | 10/2003 | Anji ...................... | C04B 35/632 422/179 |
| 2006/0154040 A1 | * | 7/2006 | Merry .................. | D04H 1/4209 428/292.1 |
| 2006/0257298 A1 | * | 11/2006 | Merry ................ | B01D 46/2422 422/179 |
| 2009/0060800 A1 | * | 3/2009 | Fernandes, Jr. ....... | F01N 3/2857 422/168 |
| 2011/0023430 A1 | * | 2/2011 | Kumar ................... | B32B 17/02 55/486 |

(Continued)

FOREIGN PATENT DOCUMENTS

JP    2012-233443    11/2012

*Primary Examiner* — Tom P Duong
(74) *Attorney, Agent, or Firm* — Nixon & Vanderhye P.C.

(57) ABSTRACT

An electrically heated catalyst includes a honeycomb structure and is designed to be mounted in an exhaust pipe in which exhaust gas flows. The honeycomb structure exhibits catalytic activities and produce heat upon electrical energization. The honeycomb structure includes a grid portion defining a plurality of cells and an outer peripheral portion which covers an outer periphery of the grid portion. A surface of the grid portion and a surface of the outer peripheral portion are designed to ensure electrical insulation from the exhaust pipe.

5 Claims, 10 Drawing Sheets

(56) References Cited

U.S. PATENT DOCUMENTS

| | | | |
|---|---|---|---|
| 2012/0186239 A1* | 7/2012 | Ando | F01N 3/2871 60/303 |
| 2013/0025267 A1 | 1/2013 | Yoshioka et al. | |
| 2013/0336847 A1* | 12/2013 | Yoshioka | F01N 3/2853 422/174 |
| 2016/0115843 A1 | 4/2016 | Mutsuda et al. | |

* cited by examiner 17  18

17  18  19

13

11  20
(17) (18)

ELECTRICALLY HEATED CATALYST

CROSS REFERENCE TO RELATED DOCUMENTS

The present application is a continuation application of International Application No. PCT/JP2019/004764, filed Feb. 11, 2019, which claims priority to Japanese Patent Application No. 2018-48480 filed on Mar. 15, 2018. The contents of these applications are incorporated herein by reference.

TECHNICAL FIELD

This disclosure generally relates to an electrically heated catalyst.

BACKGROUND ART

An electrically heated catalyst (EHC) is known which has an exhaust emission control function, is retained by a honeycomb structure, and capable of being heated by electrically energizing the honeycomb structure so that it is activated. The electrically heated catalyst is installed in an exhaust pipe of, for example, vehicles and connected to a power supply circuit to constitute a high-voltage electrical circuit, thereby requiring a need for electrically insulate between the electrically heated catalyst and the exhaust pipe. There is, however, a risk that condensed water typically occurring in exhaust emission environments or particulate matter (PM), such as carbon particulates, may decrease the insulation between the electrically heated catalyst and the exhaust pipe, thereby causing overcurrent to flow into the power supply circuit through the honeycomb structure. For instance, a structure, as taught in the patent literature 1, has an insulating layer disposed on an inner wall of the exhaust pipe to avoid the above decrease in insulation.

PRIOR ART DOCUMENT

Patent Literature

PATENT LITERATURE 1 Japanese patent first publication No. 2016-84777

SUMMARY OF THE INVENTION

The structure, as taught in the patent literature 1, needs to have an insulating layer over a wide area of the inner wall of the exhaust pipe in light of occurrence of a large volume of condensed water or a large deposited amount of PM in the exhaust pipe. This, however, results in an increase in production cost or production difficulty. When the honeycomb structure is splashed with water containing conductive substances, it results in a large decrease in electrical resistance in the honeycomb structure, which leads to a risk that overcurrent may flow through a power supply circuit. Reduction in volume of condensed water accumulated in the exhaust pipe to eliminate a risk of contact of the condensed water with the honeycomb structure may be achieved by altering the configuration of the exhaust pipe, however, it needs to design the exhaust pipe to have a complicated shape, thus resulting in an increase in pressure loss arising from an increase in resistant to flow of the exhaust gas which will lead to a drop in engine output.

This disclosure provides an electrically heated catalyst which is capable of avoiding a reduction in insulation in a honeycomb structure and also avoiding a drop in engine output.

According to one aspect of this disclosure, there is provided an electrically heated catalyst which includes a honeycomb structure which exhibits catalytic activity and produce heat upon energization thereof and is designed to be mounted in an exhaust pipe in which exhaust gas flows. The honeycomb structure includes a grid portion which defines a plurality of cells and an outer peripheral portion which covers an outer periphery of the grid portion. A surface of the grid portion and a surface of the outer peripheral portion are configured to ensure electrical insulation from the exhaust pipe, at least a portion of the surface of the grid portion and at least a portion of the surface of the outer peripheral portion have formed thereon insulating layers which ensure the electrical insulation from the exhaust pipe, and the insulating layers are formed in a region of the honeycomb structure which extends from the outer peripheral portion toward a center of the grid portion, as viewed in a cross section taken perpendicular to a direction of flow of the exhaust gas in the exhaust pipe.

The above electrically heated catalyst has the surface of the grid portion and the surface of the outer peripheral portion which are configured to achieve the electrical insulation from the exhaust pipe. This keeps the electrical insulation of the honeycomb structure even when a large amount of condensed water occurs in the exhaust pipe or a large amount of PM is deposited in the exhaust pipe, thereby reducing a rise in production cost or an increase in production difficulty as compared with a case where an insulating layer is disposed on an inner wall of the exhaust pipe. It is also possible to ensure the electrical insulation even when the honeycomb structure is splashed with water containing conductive substances, thereby avoiding flow of overcurrent through a power circuit. There is also no need for altering the configuration of the exhaust pipe in order to avoid splashing of water on the honeycomb structure, thereby enabling the exhaust pipe in which the electrically heated catalyst is mounted to have a simple shape. This avoids a drop in engine output arising from a rise in pressure loss.

As apparent from the above discussion, this disclosure provides an electrically heated catalyst which is capable of avoiding a decrease in degree of electrical insulation of the honeycomb structure and also avoiding a drop in engine output.

Symbols in brackets in the claims are used only to indicate correspondences to parts discussed in the following embodiments and do not limit the technical scope of the disclosure.

BRIEF DESCRIPTION OF THE DRAWINGS

The above described object, another object, features, or beneficial advantages in this disclosure will be apparent from the appended drawings or the following detailed discussion.

In the drawings.

EMBODIMENTS FOR CARRYING OUT THE INVENTION

First Embodiment

Figure 1:
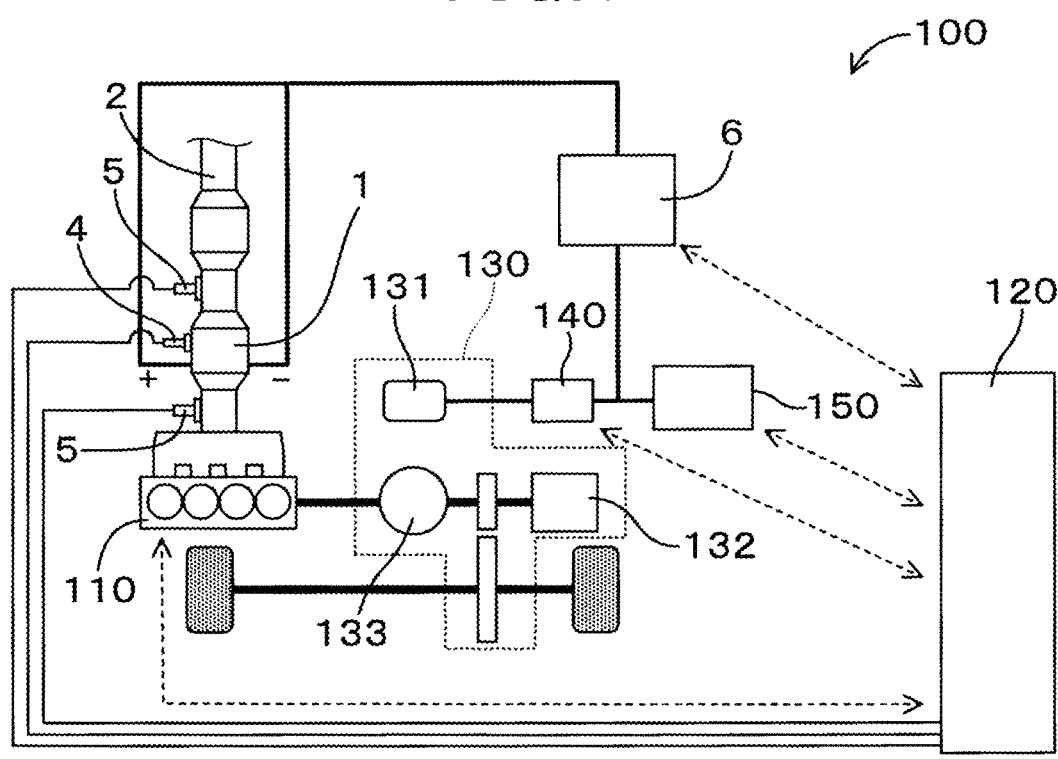
FIG. 1 is a schematic view which shows a structure of a vehicle equipped with an electrically heated catalyst according to the first embodiment.

An embodiment of the above electrically heated catalyst will be described below with reference to FIGS. 1 to 5. The electrically heated catalyst 1 in this embodiment is equipped with the honeycomb structure 10 and installed in the exhaust pipe 2 in which exhaust gas flows. The honeycomb structure 10 exhibits catalytic activity and is designed to be heated upon electrical energization thereof. The honeycomb structure 10 also includes the grid portion 11 which defines a plurality of cells 13 and an outer peripheral portion 12 which covers the outer periphery 11a of the grid portion 11. The surface of the grid portion 11 and the surface of the outer peripheral portion 12 are designed to ensure the stability in insulation from the exhaust pipe 2.

Next, the electrically heated catalyst 1 in this embodiment will be described below in detail. The electrically heated catalyst 1 is, as clearly illustrated in FIG. 1, mounted in the exhaust pipe 2 of the vehicle 100. The vehicle 100 is equipped with the EHC power circuit 6 which delivers an electrical current to the electrically heated catalyst 1. The vehicle 100 is also equipped with the engine 110, the ECU 120, the hybrid transmission 130, the inverter 140, and the high-voltage battery 150. The hybrid transmission 130 is equipped with the electrical generator 131, the motor 132, and the power splitter 133.

Figure 2:
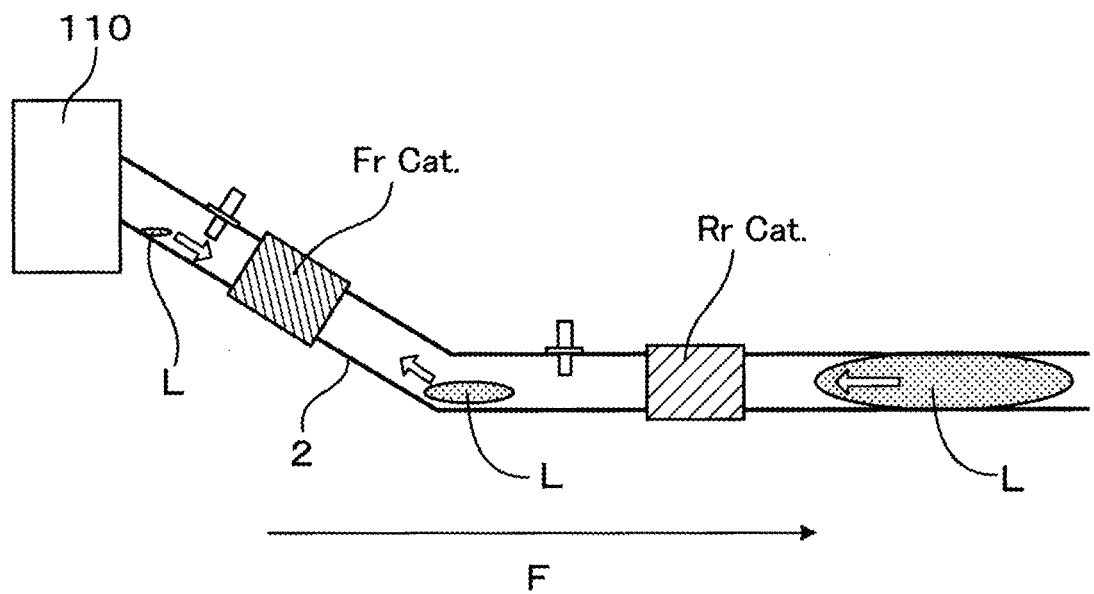
FIG. 2 is a schematic view which illustrates layout of an electrically heated catalyst according to the first embodiment.
Figure 3A:
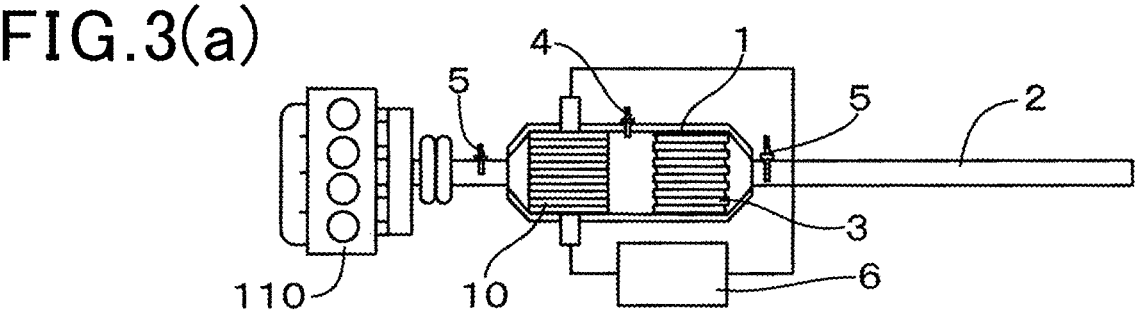
FIGS. 3(a) to 3(e) are schematic views which illustrate layouts of an electrically heated catalyst according to the first embodiment.

In this embodiment, the electrically heated catalyst 1 is, as can be seen in FIG. 2, arranged in a horizontal portion of the exhaust pipe 2 as a rear catalyst (Rr Cat.) In this embodiment, the electrically heated catalyst 1 is, as illustrated in FIG. 3(a), equipped with the honeycomb structure 10 which exhibits exhaust emission control activity, the exhaust gas filter 3, the exhaust gas temperature sensor 4, and the exhaust gas sensor 5. The exhaust gas filter 3 is designed to collect particulate matter therein and placed downstream of the honeycomb structure 10.

Figure 3B:
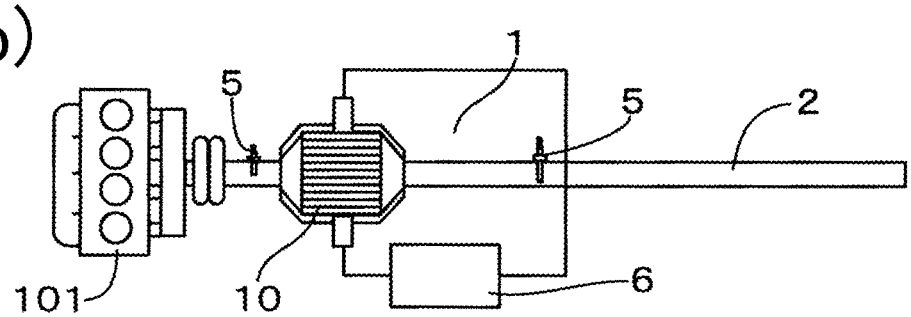
Figure 3C:
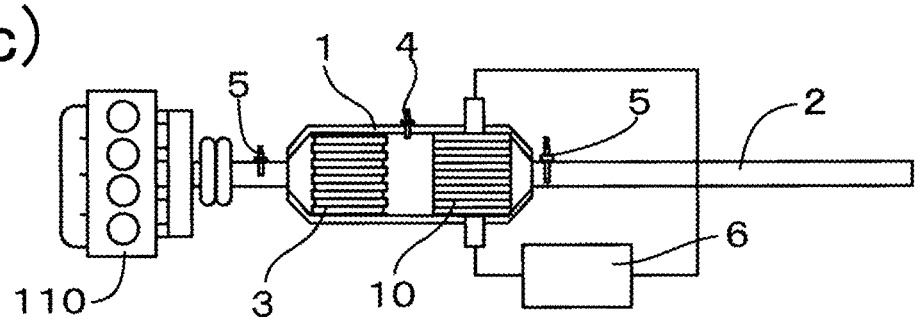
Figure 3D:
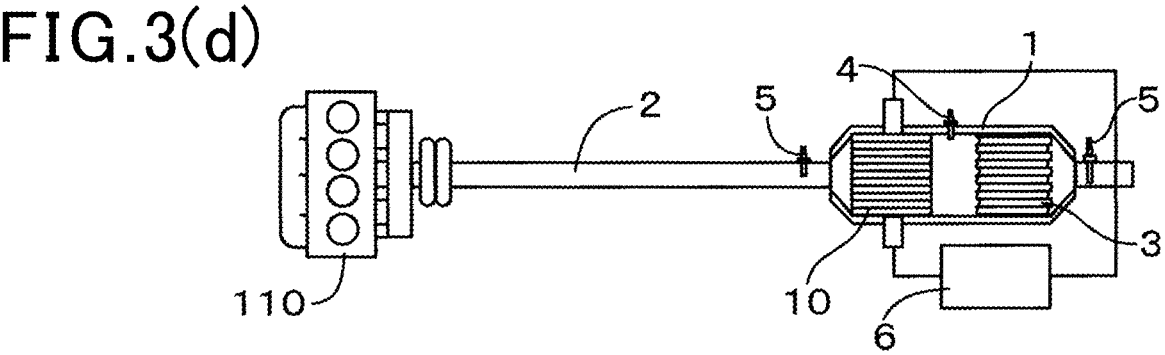
Figure 3E:
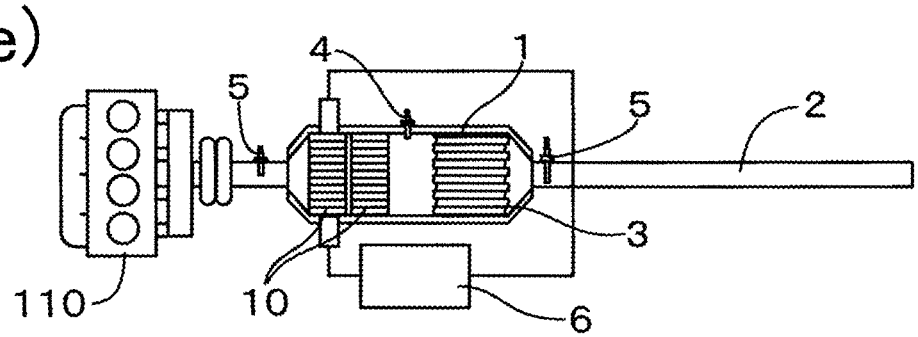

The electrically heated catalyst 1 may alternatively be designed, as illustrated in FIG. 3(b), not to have the exhaust gas filter 3. The exhaust gas filter 3 may alternatively be, as illustrated in FIG. 3(c), arranged upstream of the honeycomb structure 10. The electrically heated catalyst 1 may be, as illustrated in FIG. 3(d), located more downstream than that illustrated in FIG. 3(a) is. The honeycomb structure 10 may alternatively be, as illustrated in FIG. 3(e), made up of two parts: an upstream portion and a downstream portion with only the upstream portion connected to the EHC power circuit so that it is heated.

Figures 4A, 4B:
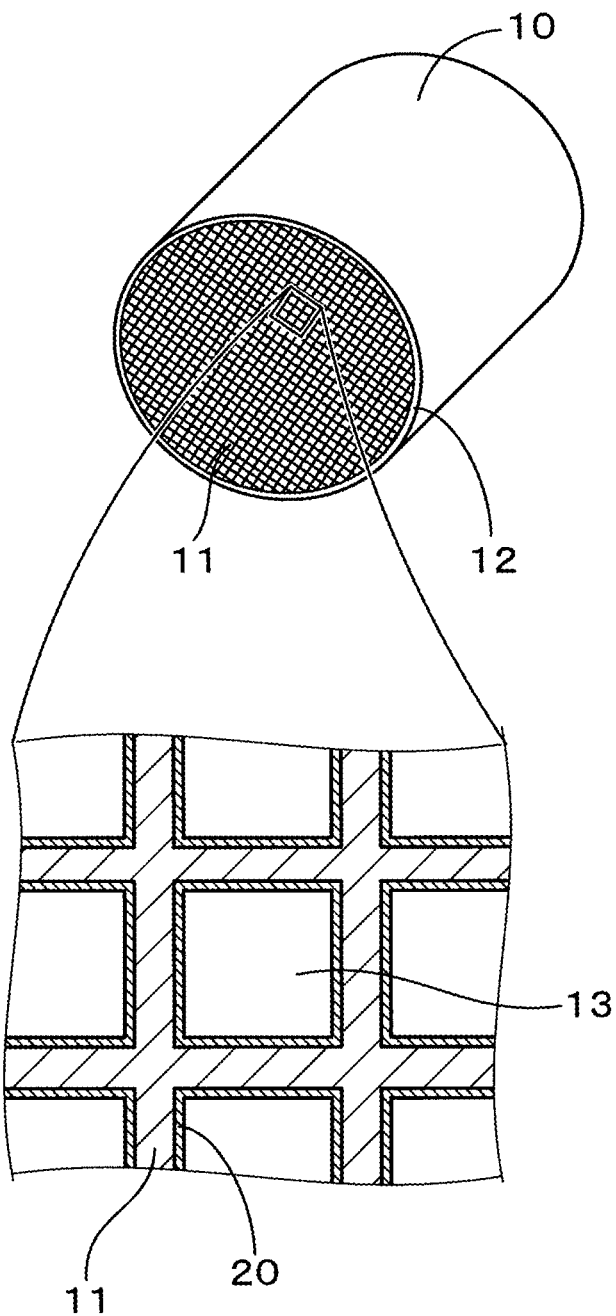
FIG. 4(a) is a perspective view of a honeycomb structure in the first embodiment.
FIG. 4(b) is an enlarged view of a grid portion.
Figure 5:
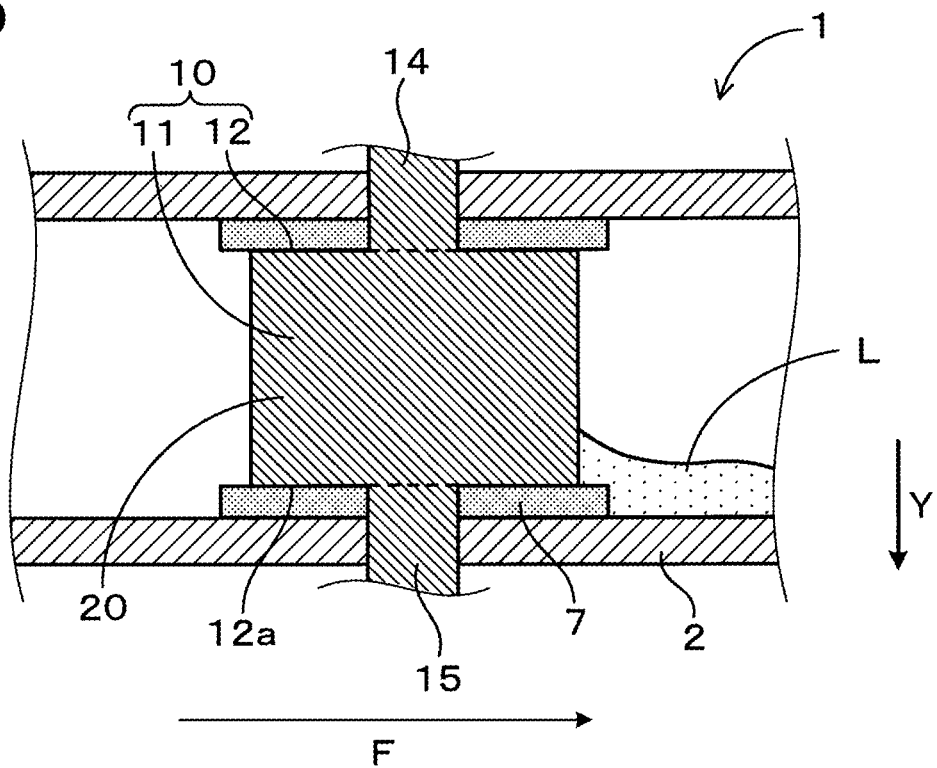
FIG. 5 is a schematic sectional view which shows an electrically heated catalyst in the first embodiment.

The honeycomb structure 10 retains therein three-way catalyst or NOx-reduction catalyst and exhibits exhaust emission control activity. The outer peripheral portion 12 of the honeycomb structure 10 is, as illustrated in FIGS. 4(a) and 4(b), of a cylindrical shape contoured to conform with the shape of the exhaust pipe 2 and has the grid portion 11 arranged therein. The grid portion 11 defines a plurality of cells 13. The cells 13, as illustrated in FIG. 5, extend in a direction F in which exhaust gas flows in the exhaust pipe 2 (see FIG. 5) and define exhaust gas paths in the honeycomb structure 10. The electrically heated catalyst 1 is, as illustrated in FIG. 5, equipped with the EHC connectors 14 and 15 for electrical connection between the honeycomb structure 10 and the EHC power circuit 6 (see FIG. 1). The insulating mat 7 is disposed between the electrically heated catalyst 1 and the exhaust pipe 2.

The insulating layers 20 are, as illustrated in FIGS. 4(a) and 4(b), disposed on at least a portion of surfaces of the grid portion 11 and the outer peripheral portion 12. In this embodiment, the insulating layers 20 are, as can be seen in FIG. 5, arranged on the whole areas of all the surfaces of the grid portion 11 and the outer peripheral portion 12 and also occupy surfaces of the EHC connectors 14 and 15. The thickness of the insulating layers 20 is optional and may be selected within a range which ensures a desired degree of insulation of the honeycomb structure 10.

In this embodiment, the insulating layers 20 are made of oxide layers produced by oxidizing the surfaces of the grid portion 11 and the outer peripheral portion 12. The insulating layers 20 may alternatively be implemented by insulating coatings formed on the surfaces of the grid portion 11 and the outer peripheral portion 12. This facilitates formation of the insulating layers 20.

In the electrically heated catalyst 1 in this embodiment, when a large amount of condensed water occurs inside the exhaust pipe 2, it will be accumulated on the bottom of the exhaust pipe 2 in the direction Y of gravitational force. A portion L of the water may, as illustrated in FIGS. 4(a) and 4(b), splash on the honeycomb structure 10 of the electrically heated catalyst 1. When the water L contains conductive substances, the insulating layers 20 ensure the stability in insulation between the honeycomb structure 10 and the exhaust pipe 2, thereby avoiding flow of overcurrent through the EHC power circuit 6 (see FIG. 1). Although not illustrated, when a large amount of PM is accumulated in the honeycomb structure 10, the insulation of the honeycomb structure 10 is ensured. This also avoids flow of overcurrent through the EHC power circuit 6 (see FIG. 1).

This embodiment reduces a rise in cost or an increase in production difficulty as compared with a case where the insulating layer 20 is disposed on an inner wall of the exhaust pipe 2. There is also no need to alter the shape of the exhaust pipe 2 in order to avoid splashing of water on the honeycomb structure 10, thus enabling the exhaust pipe 2 in which the electrically heated catalyst 1 is mounted to have a simple configuration. This avoids a reduction in engine output arising from an increase in pressure loss in the vehicle 100 in which the electrically heated catalyst 1 is mounted.

This embodiment has the insulating layers 20 disposed on at least a portion of the outer surface of the grid portion 11 and at least a portion of the outer surface of the outer peripheral portion 12 to ensure the stability in insulation thereof from the exhaust pipe 2. This facilitates achievement of insulation of the honeycomb structure 10 without having to make the electrically heated catalyst 1 have a complicated structure.

As apparent from the above discussion, it is possible for this embodiment to provide the electrically heated catalyst 1 which is capable of avoiding a decrease in degree of insulation of the honeycomb structure 10 and also avoiding a drop in engine output.

Second Embodiment

Figure 6:
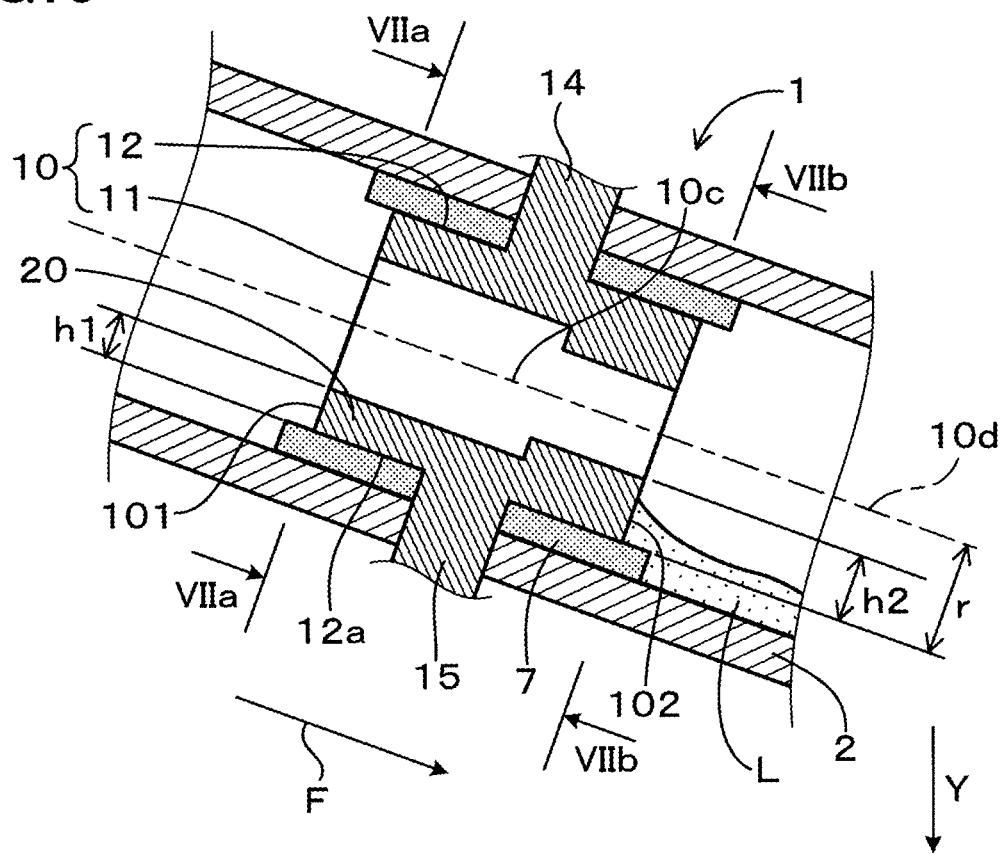
FIG. 6 is a schematic sectional view which illustrates an electrically heated catalyst in the second embodiment.
Figure 7A:
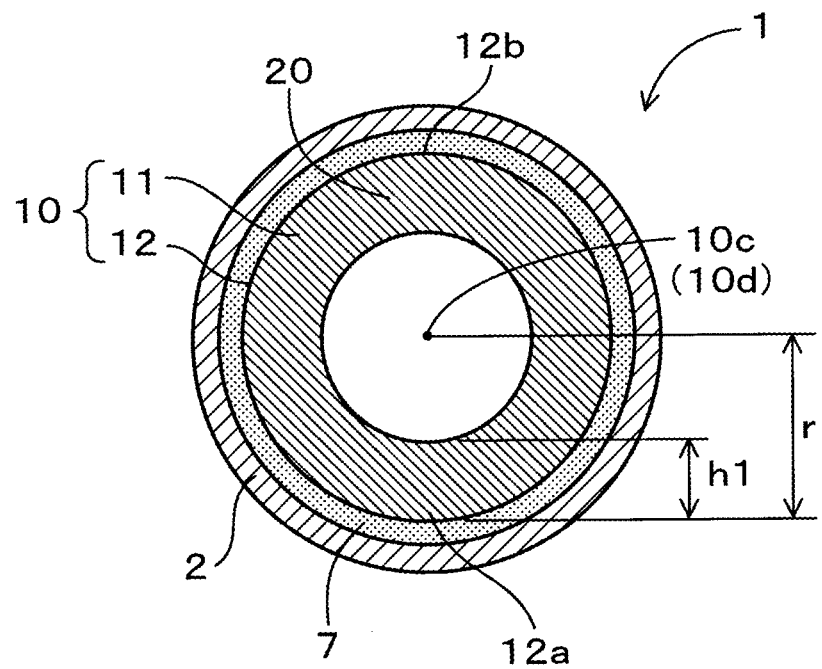
FIG. 7(a) is a sectional view taken along the line VIIa-VIIa in FIG. 6.
Figure 7B:
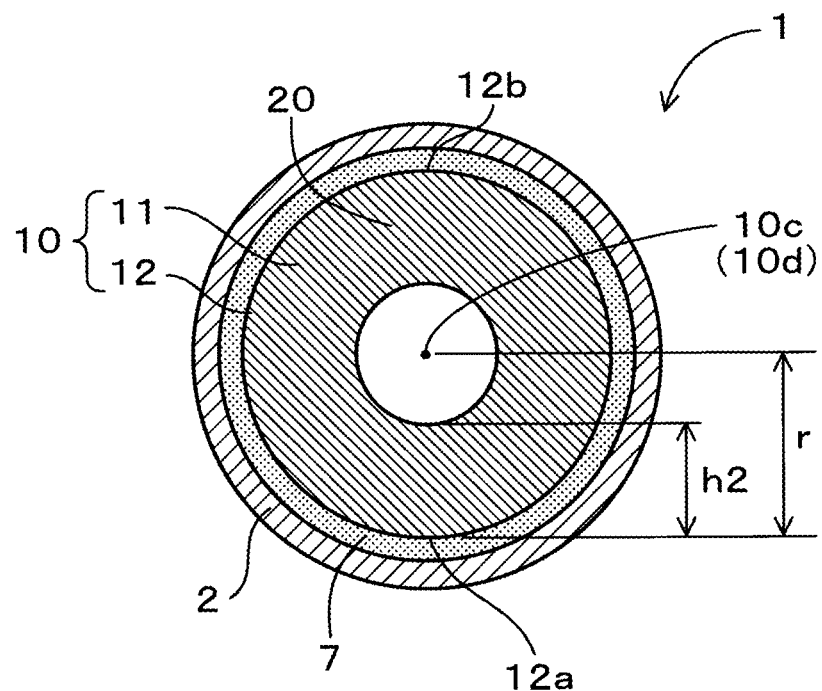
FIG. 7(b) is a sectional view taken along the line VIIb-VIIb in FIG. 6.

The first embodiment has the electrically heated catalyst 1 placed in a horizontal portion of the exhaust pipe 2 (see FIG. 2) as an UF/C (i.e., an under-floor converter), but however, the electrically heated catalyst 1 in this embodiment may be, as illustrated in FIG. 6, disposed as a front catalyst (i.e., Fr Cat in FIG. 2) in a portion of the exhaust pipe 2 which extends in a downstream direction and slants downward in the direction Y of gravitational force. The first embodiment has the insulating layers 20 formed on the whole of the grid portion 11 and the outer peripheral portion 12, however, this embodiment, as can be seen in FIG. 6, has the insulating layers 20 formed over regions of the honeycomb structure 10 extending from the outer peripheral portion 12 by given distances h1 and h2 toward the center line 10d extending through the center 10c of the honeycomb structure 10 parallel to the direction F of flow of exhaust gas, as viewed on a cross section of the honeycomb structure 10 taken perpendicular to the direction F of flow of exhaust gas. The upstream end portion 101 of the honeycomb structure 10 illustrated in FIG. 6 has the insulating layers 20 which, as can be seen in FIG. 7(a), occupy a region extending from the outer peripheral portion 12 by the height h1 toward the center 10c of the honeycomb structure 10. The downstream end portion 102 of the honeycomb structure 10 has the insulating layers 20 which, as can be seen in FIG. 7(b), occupy a region extending from the outer peripheral portion 12 by the height h2 toward the center 10c of the honeycomb structure 10. In this embodiment, the heights h1 and h2 may be selected to be larger than one-quarter of the radius r or more and less than the radius r that is a radius of a sectional area of the honeycomb structure 10 taken perpendicular to the direction F of flow of exhaust gas in the honeycomb structure 10.

Further, in this embodiment, the insulating layers 20 are, as clearly illustrated in FIG. 6, formed on the upstream end portion 101 and the downstream end portion 102 of the honeycomb structure 10 in the direction F of flow of exhaust gas. The height h2 of the insulating layer 20 on the downstream end portion 102 from the outer peripheral portion 12 is larger than the height h1 of the insulating layer 20 on the upstream end portion 101 from the outer peripheral portion 12. Usually, the exhaust pipe 2 is lower in temperature in a downstream portion, thus having an increased risk that condensed water may occur in the downstream portion. The insulating layers 20 on a downstream side of the honeycomb structure 10 are, therefore, formed over a region extending higher from the lowermost portion 12a of the outer peripheral portion 12 than a region in which the insulating layers 20 on an upstream side of the honeycomb structure 10 are formed does when the electrically heated catalyst 1 is mounted in the exhaust pipe 2 to have the insulating layers 20 occupying the lowermost portion 12a on the upstream and downstream sides of the honeycomb structure 10. This layout causes the insulating layers 20 to occupy a portion of the honeycomb structure 10 which is likely to be splashed with water L in the exhaust pipe 2, thereby enhancing the degree of the insulation.

In this embodiment, the insulating layers 20 occupy regions of the honeycomb structure 10 which extend from the outer peripheral portion 12 by the given heights h1 and h2 toward the center 10c of the honeycomb structure 10, as viewed on a cross section of the honeycomb structure 10 perpendicular to the direction F of flow of exhaust gas. The honeycomb structure 10, therefore, has the insulating layers 20 not occupying a central region including the center 10c of the honeycomb structure 10, thereby facilitating passage of exhaust gas through the honeycomb structure 10 to avoid an increase in pressure loss in order to avoid a drop in engine output.

In this embodiment, the same reference numbers as employed in the first embodiment are assigned to the same parts, and explanation thereof is omitted. This embodiment offers the same beneficial advantages as those in the first embodiment.

Third Embodiment

Figure 8:
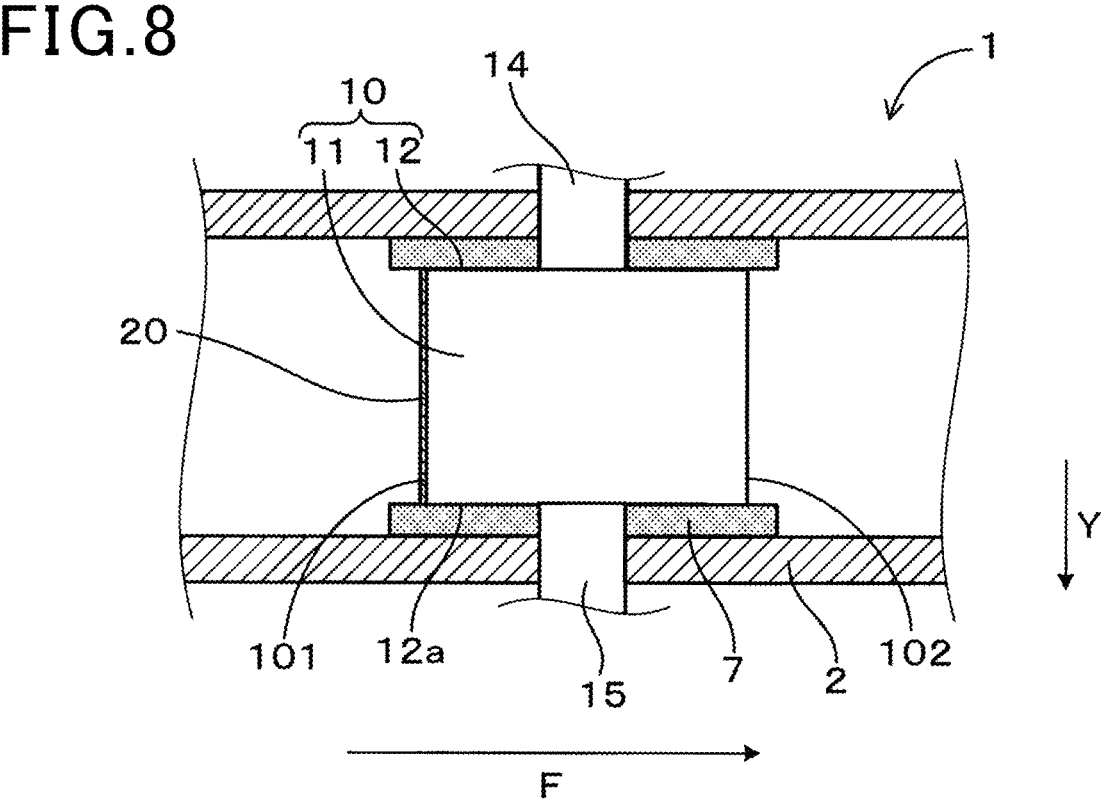
FIG. 8 is a schematic sectional view which illustrates an electrically heated catalyst in the third embodiment.

This embodiment, as illustrated in FIG. 8, has the insulating layer 20 formed on an entire area of the upstream end portion 101 of the honeycomb structure 10. This maintains the insulation between the honeycomb structure 10 and the exhaust pipe 2 when a large amount of PM flowing from the upstream side to the downstream side of the exhaust pipe 2 is deposited on the upstream end portion 101 of the honeycomb structure 10. The honeycomb structure 10, therefore, has a decreased region in which the insulating layers 20 are formed, thereby avoiding an increase in pressure loss to avoid a drop in engine output.

Fourth Embodiment

Figure 9:
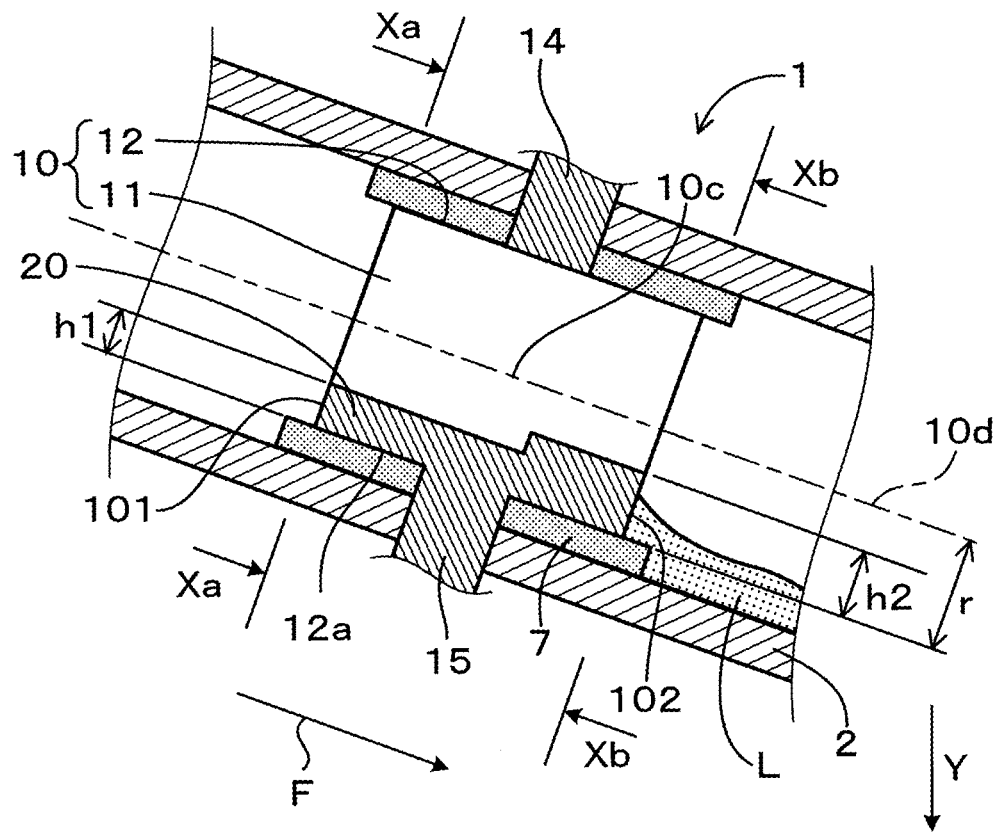
FIG. 9 is a schematic sectional view which illustrates an electrically heated catalyst in the fourth embodiment.
Figure 10A:
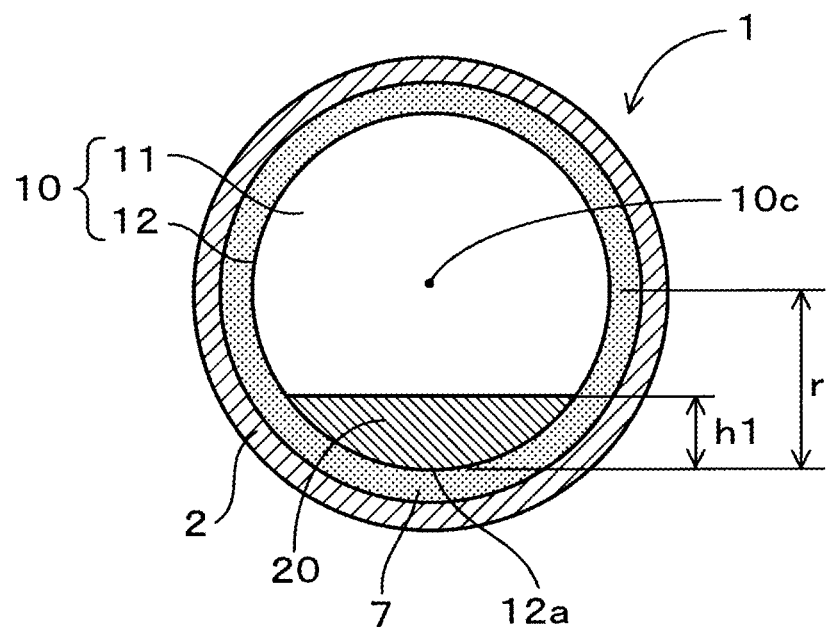
FIG. 10(a) is a sectional view taken along the line Xa-Xa in FIG. 9.
Figure 10B:
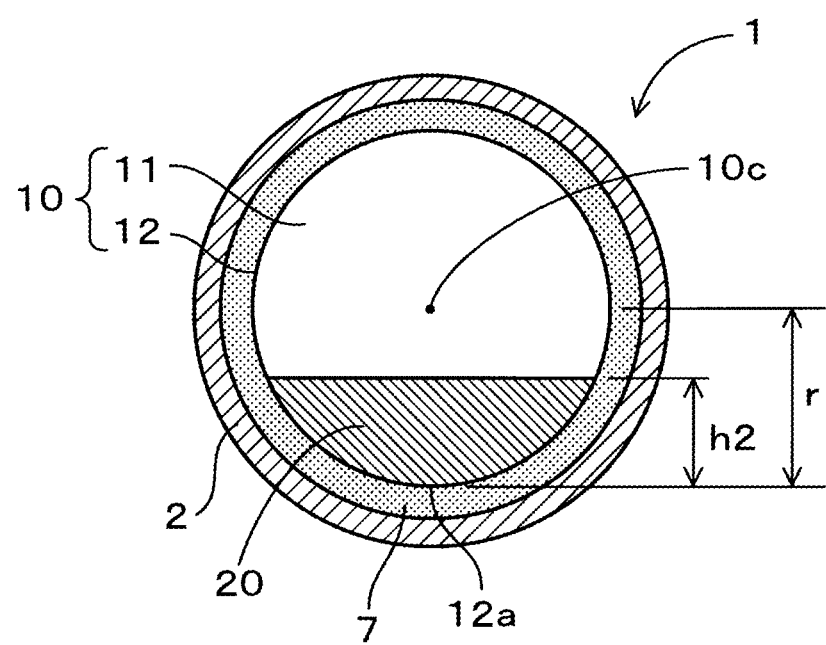
FIG. 10(b) is a sectional view taken along the line Xb-Xb in FIG. 9.

The second embodiment has the insulating layers 20 formed in the regions extending from the outer peripheral portion 12 by the heights h1 and h2 toward the center 10c, however, this embodiment, as illustrated in FIGS. 9, 10(a) and 10(b), has the insulating layers 20 formed in regions extending from the lowermost portion 12a of the outer peripheral portion 12 by the heights h1 and h2 toward the center line 10d in a condition where the electrically heated catalyst 1 is mounted in the exhaust pipe 2.

The electrically heated catalyst 1 in this embodiment achieves a large decrease in size of the region in which the insulating layers 20 are formed, thereby reducing a pressure loss to avoid a drop in engine output. The electrically heated catalyst 1 is mounted in a downstream portion of the exhaust pipe 2 which is inclined downward, thus resulting in a risk that a lower portion of the downstream end portion 102 of the honeycomb structure 10 may be splashed with water L. The lower portion of the downstream end portion 102 has, however, the insulating layers formed thereon, which will improve the insulation.

Figure 11:
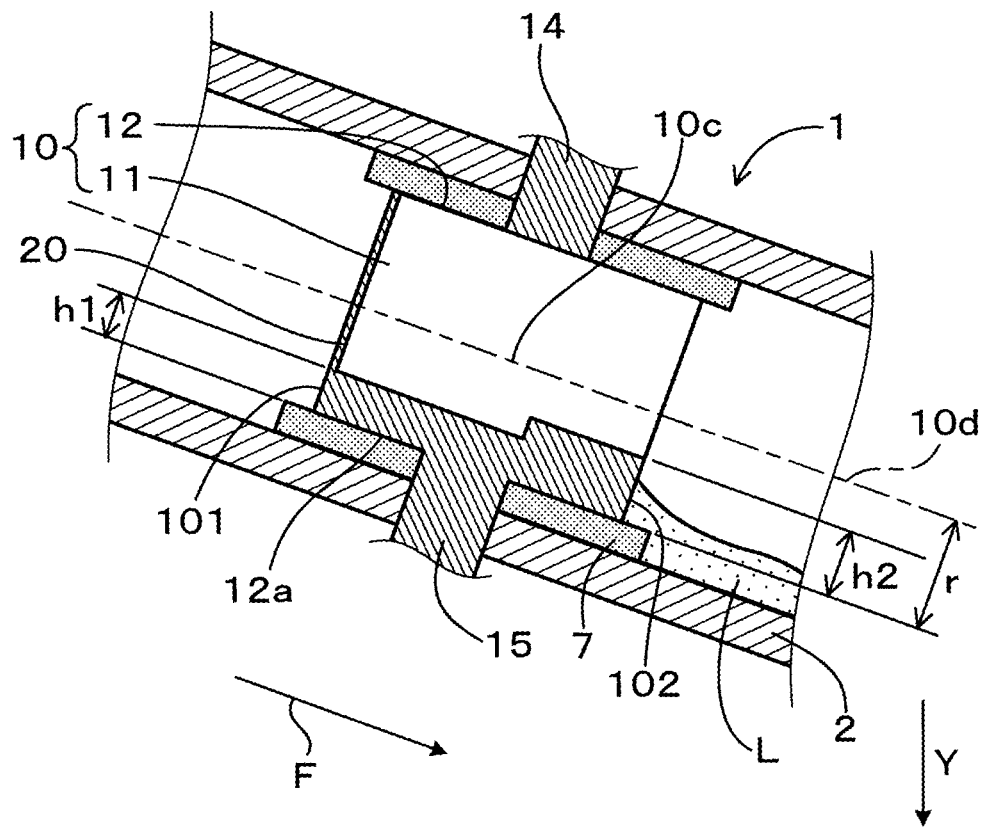
FIG. 11 is a schematic sectional view which illustrates an electrically heated catalyst in the first modification.

As the first modification, this embodiment may be, as illustrated in FIG. 11, modified to have the insulating layers 20 disposed, like in the third embodiment, on the whole of the upstream end portion 101 of the honeycomb structure 10. The first modification offers substantially the same beneficial advantages as those in the fourth embodiment and also ensures the insulation of the electrically heated catalyst 1 even when a large amount of PM is deposited on the upstream end portion 101.

Figure 12:
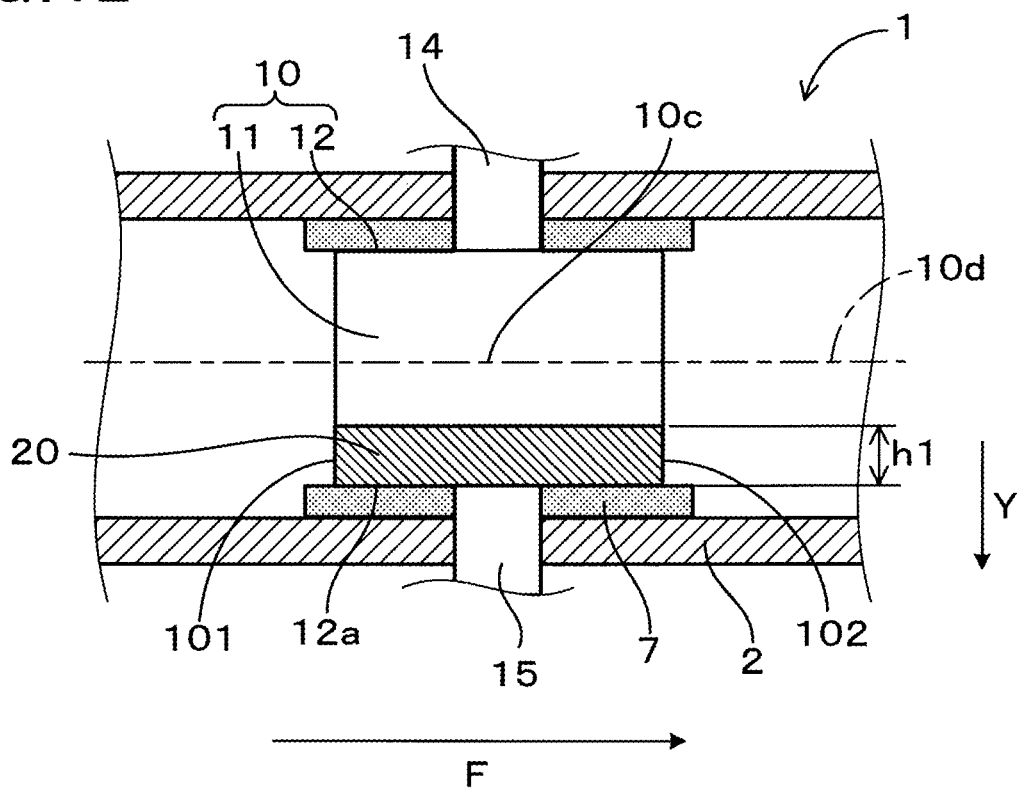
FIG. 12 is a schematic sectional view which illustrates an electrically heated catalyst in the second modification.

As the second modification, the electrically heated catalyst 1 may be, as illustrated in FIG. 12, mounted in a horizontal portion of the exhaust pipe 2. The insulating layers 20 are formed in a region of the honeycomb structure 10 which extends from the lowermost portion 12$a$ of the outer peripheral portion 12 by a given height h1 toward the center line 10$d$ passing through the center 10$c$ in a condition where the electrically heated catalyst 1 is mounted in the exhaust pipe 2. Heights of the insulating layers 20 may be identical with each other between the upstream end portion 101 and the downstream end portion 102 of the honeycomb structure 10.

Figure 13:
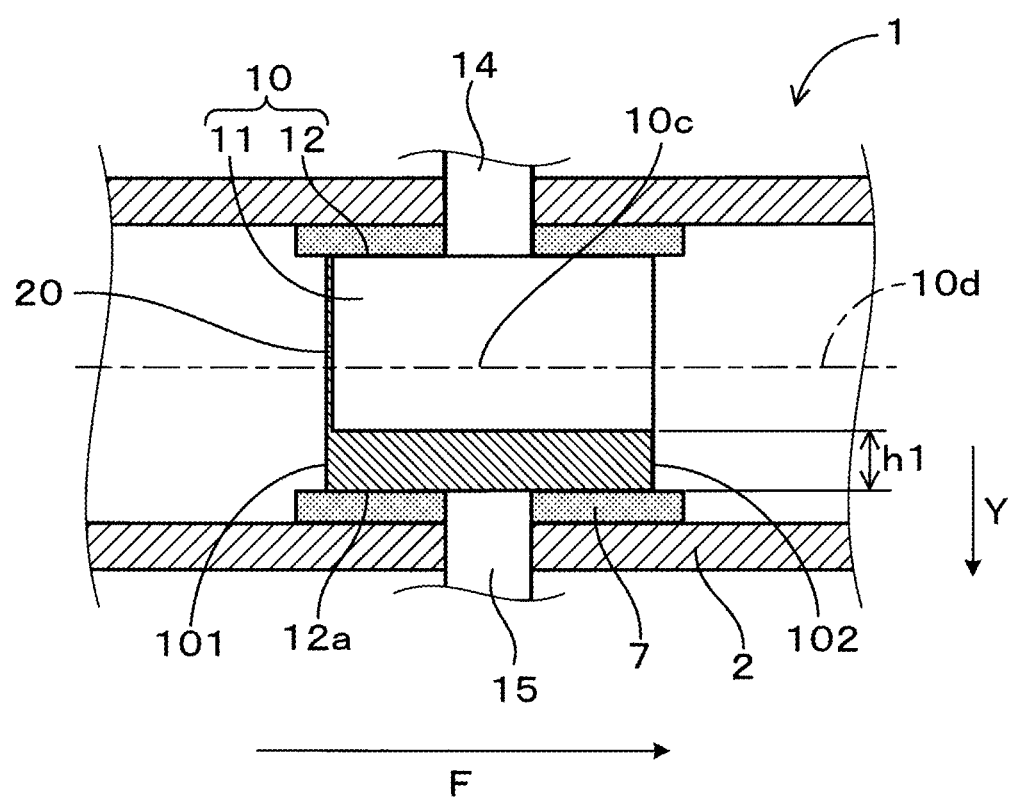
FIG. 13 is a schematic sectional view which illustrates an electrically heated catalyst in the third modification.

As the third modification, the structure in the second modification in FIG. 12 may be modified, as illustrated in FIG. 13, to have additional insulating layers 20 disposed on the whole of the upstream end portion 101 of the honeycomb structure 10. The first to third modification offer substantially the same beneficial advantages as those in the first embodiment.

Figure 14A:
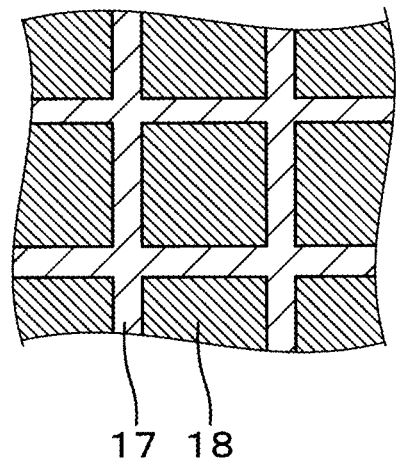
FIGS. 14(a)-(c) are enlarged views of a grid portion of a honeycomb structure in the fourth modification.
Figure 14B:
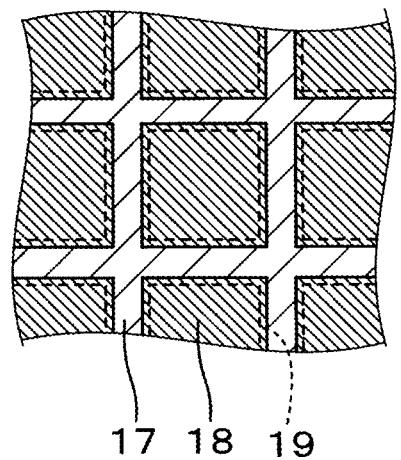
Figure 14C:
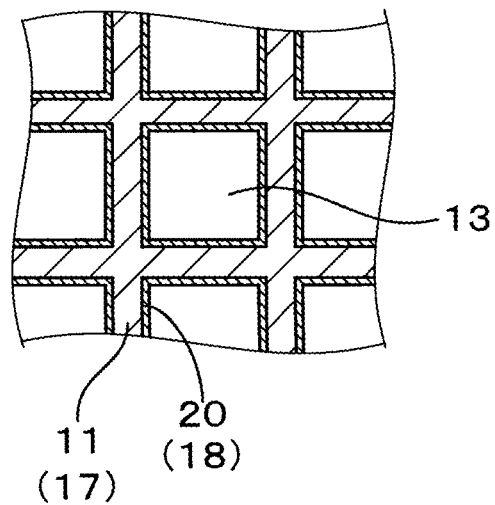

As the fourth modification, the honeycomb structure 10 may be designed to include, as illustrated in FIG. 14(*c*), the first material-made portion 17 and the second material-made portions 18. The first material-made portion 17 is made from a first material. The second material-made portions 18 are made from a second material which is lower in degree of electrical conductivity than the first material. The insulating layers 20 are implemented by the second material-made portions 18. The fourth modification is capable of forming the insulating layers 20 in a production process in which the honeycomb structure 10 is fabricated, thereby eliminating the need for an additional process for making the insulating layers 20. The fourth modification offers the same beneficial advantages as those in the first to fourth embodiments.

A production method of the honeycomb structure 10 in the fourth modification includes a step of first preparing the first material and the second material which is lower in electrical conductivity than the first material, a step of forming the grid-shaped first material-made portion 17 and the second material-made portions 18 using the first and second materials, respectively, with the second material-made portions 18 being, as illustrated in FIG. 14(*a*), disposed inside the first material-made portion 17, and a step of extracting, from the second material-made portions 18, portions which correspond to the extracted portions 19 which are slightly smaller in size than external forms of the second material-made portions 18 separated by the grip of the firs material-made portion 17, thereby forming the cells 13 illustrated in FIG. 14(*c*) to complete the honeycomb structure 10.

This disclosure is not limited to each of the above embodiments and modifications, but may be modified without departing from the principle thereof. For instance, the honeycomb structure 10 in the fourth modification may be used in the first to fourth embodiment and the first to third modification.

While this disclosure has been shown in terms of the preferred embodiments in order to facilitate better understanding thereof, it should be appreciated that the disclosure is not limited to the structures of the embodiments. Therefore, the disclosure should be understood to include all possible embodiments and modifications to the shown embodiments which can be embodied without departing from the principle thereof.

What is claimed is:

1. An electrically heated catalyst which includes a honeycomb structure which exhibits catalytic activity and produces heat upon energization thereof and is designed to be mounted in an exhaust pipe in which exhaust gas flows, wherein the honeycomb structure includes a grid portion which defines a plurality of cells and an outer peripheral portion which covers an outer periphery of the grid portion, a surface of the grid portion and a surface of the outer peripheral portion are configured to ensure electrical insulation from the exhaust pipe, at least a portion of the surface of the grid portion and at least a portion of the surface of the outer peripheral portion have formed thereon isulating layers which ensure the electrical insulation from the exhaust pipe, and the insulating layers are formed in a region of the honeycomb structure which extends from the outer peripheral portion toward a center of the grid portion, as viewed in a cross section taken perpendicular to a direction of flow of the exhaust gas in the exhaust pipe.

2. The electrically heated catalyst as set forth in claim 1, wherein the insulating layers are formed in a region of the honeycomb structure which extends from a lowermost portion of the outer peripheral portion in a direction of gravitational force by the given height when the electrically heated catalyst is mounted in the exhaust pipe.

3. The electrically heated catalyst as forth in claim 1, wherein the insulating layers are formed at least on an upstream end portion and a downstream end portion of the honeycomb structure in the direction of flow of the exhaust gas, and wherein a height of the insulating layers on the downstream end portion from the outer peripheral portion is larger than that of the insulating layers on the upstream end portion from the outer peripheral portion.

4. The electrically heated catalyst as set forth in claim 1, wherein the insulating layers are made of oxide layers produced by oxidizing the surfaces of the grid portion and the outer peripheral portion or insulating coatings formed on the surfaces of the grid portion and the outer peripheral portion.

5. The electrically heated catalyst as set forth in claim 1, wherein the honeycomb structure includes a first material-made portion made from a first material and second material-made portions made from a second material which is lower in degree of electrical conductivity than the first material, and wherein the insulating layers are implemented by the second material-made portions.

* * * * *